United States Patent
Shen et al.

(10) Patent No.: US 9,543,553 B2
(45) Date of Patent: Jan. 10, 2017

(54) SEALING MEMBER AND BATTERY COMPRISING THE SAME

(71) Applicants: Xi Shen, Shenzhen (CN); Keli Yang, Shenzhen (CN); Xuefeng Zhang, Shenzhen (CN); Luxia Jiang, Shenzhen (CN); Jianhua Zhu, Shenzhen (CN)

(72) Inventors: Xi Shen, Shenzhen (CN); Keli Yang, Shenzhen (CN); Xuefeng Zhang, Shenzhen (CN); Luxia Jiang, Shenzhen (CN); Jianhua Zhu, Shenzhen (CN)

(73) Assignee: Shenzhen BYD Auto R&D Company Limited, Shenzhen (CN)

( * ) Notice: Subject to any disclaimer, the term of this patent is extended or adjusted under 35 U.S.C. 154(b) by 149 days.

(21) Appl. No.: 14/037,865

(22) Filed: Sep. 26, 2013

(65) Prior Publication Data

US 2014/0087247 A1 Mar. 27, 2014

(30) Foreign Application Priority Data

Sep. 27, 2012 (CN) ...................... 2012 2 0502764 U

(51) Int. Cl.
| | |
|---|---|
| *H01M 2/08* | (2006.01) |
| *H01M 2/12* | (2006.01) |
| *F16J 13/14* | (2006.01) |
| *H01M 10/0525* | (2010.01) |

(52) U.S. Cl.
CPC ............... *H01M 2/08* (2013.01); *F16J 13/14* (2013.01); *H01M 2/1205* (2013.01); *H01M 2/1229* (2013.01); *H01M 10/0525* (2013.01)

(58) Field of Classification Search
CPC .... H01M 2/08; H01M 2/1205; H01M 2/1229; H01M 10/0525

USPC ............ 429/185, 82, 89; 277/628, 644, 645
See application file for complete search history.

(56) References Cited

U.S. PATENT DOCUMENTS

| | | | |
|---|---|---|---|
| 915,339 A | * | 3/1909 | Ford ............................... 429/89 |
| 2,530,583 A | * | 11/1950 | Nurkiewicz ......... A62C 13/003 |
| | | | 169/75 |
| 4,595,172 A | * | 6/1986 | Henderson ................ A61F 2/80 |
| | | | 137/903 |
| 6,371,445 B1 | * | 4/2002 | Supattanasiri et al. ....... 251/368 |

(Continued)

FOREIGN PATENT DOCUMENTS

| | | |
|---|---|---|
| CN | 101313378 A | 11/2008 |
| CN | 201498559 | 6/2010 |

(Continued)

OTHER PUBLICATIONS

Machine Translation and Abstract in English of JP 2012-059803.*
ISR to PCT/CN2013/084459 dated Jan. 2, 2014 (13p).

*Primary Examiner* — Miriam Stagg
*Assistant Examiner* — Haroon S Sheikh
(74) *Attorney, Agent, or Firm* — Brinks Gilson & Lione

(57) ABSTRACT

A sealing member and a battery comprising the sealing member are provided. The sealing member comprises a sealing part, an operation part having a supporting portion, an operation protrusion disposed on an upper surface of the supporting portion, and a deformable leg depending from a bottom surface of the supporting portion. The sealing member also comprises a connecting part connecting the sealing part and operation part. The sealing part has a maximum diameter greater than that of the connecting part.

12 Claims, 6 Drawing Sheets

(56) References Cited

U.S. PATENT DOCUMENTS

2012/0040217 A1 2/2012 Kritzer et al.
2012/0171526 A1 7/2012 Ji et al.
2014/0322565 A1* 10/2014 Kusama et al. ................ 429/53

FOREIGN PATENT DOCUMENTS

| CN | 201498559 U | 6/2010 |
| CN | 201946657 | 8/2011 |
| CN | 202454632 | 9/2012 |
| CN | 203013829 | 6/2013 |
| JP | 2012-059803 | 3/2012 |

* cited by examiner

SEALING MEMBER AND BATTERY COMPRISING THE SAME

RELATED APPLICATIONS

This application claims priority and benefits of Chinese Patent Application No. 201220502764.7, filed with State Intellectual Property Office, P. R. China on Sep. 27, 2012, the entire content of which is incorporated herein by reference.

FIELD

The present disclosure generally relates to the battery field, and, more particularly, to a sealing member for a battery and a battery including the sealing member.

BACKGROUND

Batteries such as lithium ion batteries are widely used due to their small volume, high energy density, non-pollution, etc. Active materials in the battery need to be activated by a pre-charging process (also known as a transformation process), before the battery can work normally. In the transformation process, gas may be generated inside the battery. In the existing transformation process, the gas sometimes cannot be successfully discharged from the interior of the battery, or the moisture in the environmental air may be brought into the battery, causing the moisture content of the electrolyte to be over a certain limit. If the gas generated in the transformation process cannot be discharged successfully from the battery, gas expansion will occur. Gas expansion in the battery may seriously affect the properties and operation of the battery. Thus, in the transformation process, whether the gas generated inside the battery can be discharged successfully via a sealing structure of an injection hole has a great influence in the performance of the battery.

SUMMARY

In one aspect, a sealing member comprises a sealing part, an operation part having a supporting portion, an operation protrusion disposed on an upper surface of the supporting portion, a deformable leg depending from a bottom surface of the supporting portion, and a connecting part connecting the sealing part and the operation part. The sealing part has a maximum diameter greater than that of the connecting part.

In another aspect, a battery comprises a shell, a cover plate having an injection hole and configured to define a cavity with the shell, a core and electrolyte in the cavity, and a sealing member. The sealing member comprises a sealing part, an operation part having a supporting portion, an operation protrusion disposed on an upper surface of the supporting portion, a deformable leg depending from a bottom surface of the supporting portion, and a connecting part connecting the sealing part and the operation part. The deformable leg is supported on the upper surface of the cover plate. The connecting part is disposed in the injection hole. The sealing part seals the injection hole and is adapted to open the injection hole upon pressing the operation part.

In yet another aspect, a batter comprises a shell, a cover plate having an injection hole and configured to define a cavity with the shell, a core and electrolyte in the cavity, and a sealing member. The sealing member comprises a sealing part, an operation part having a supporting portion, an operation protrusion disposed on an upper surface of the supporting portion, a deformable leg depending from a bottom surface of the supporting portion, and a connecting part connecting the sealing part and the operation part. The sealing part has a maximum diameter greater than that of the connecting part.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
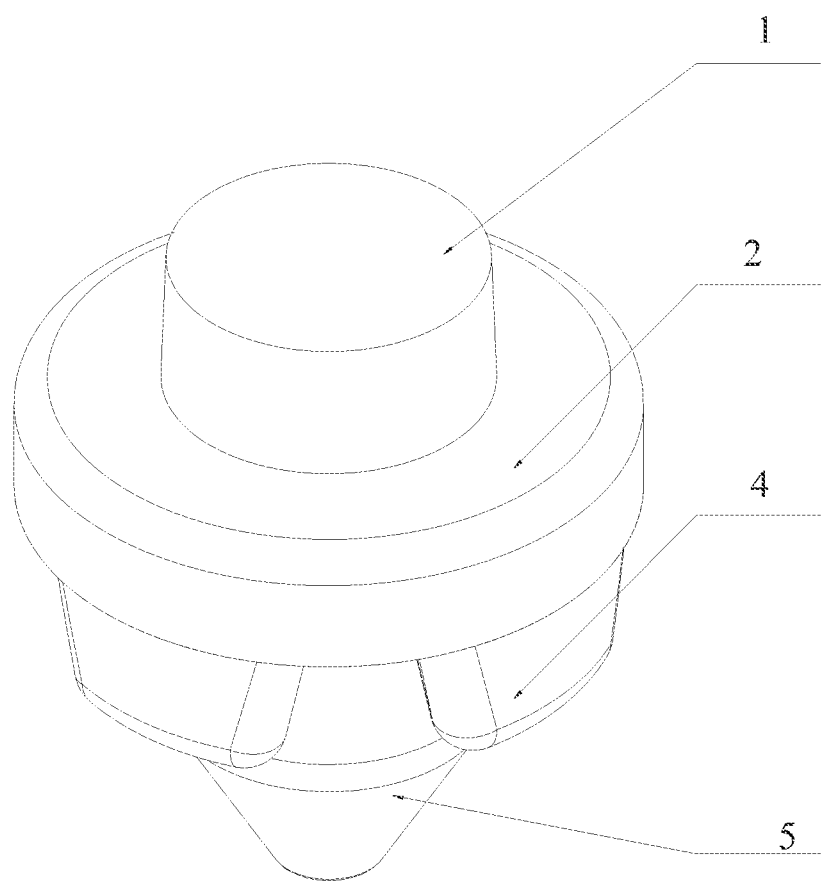
FIG. 1 is a schematic view of a sealing member according to an embodiment of the present disclosure.
Figure 2:
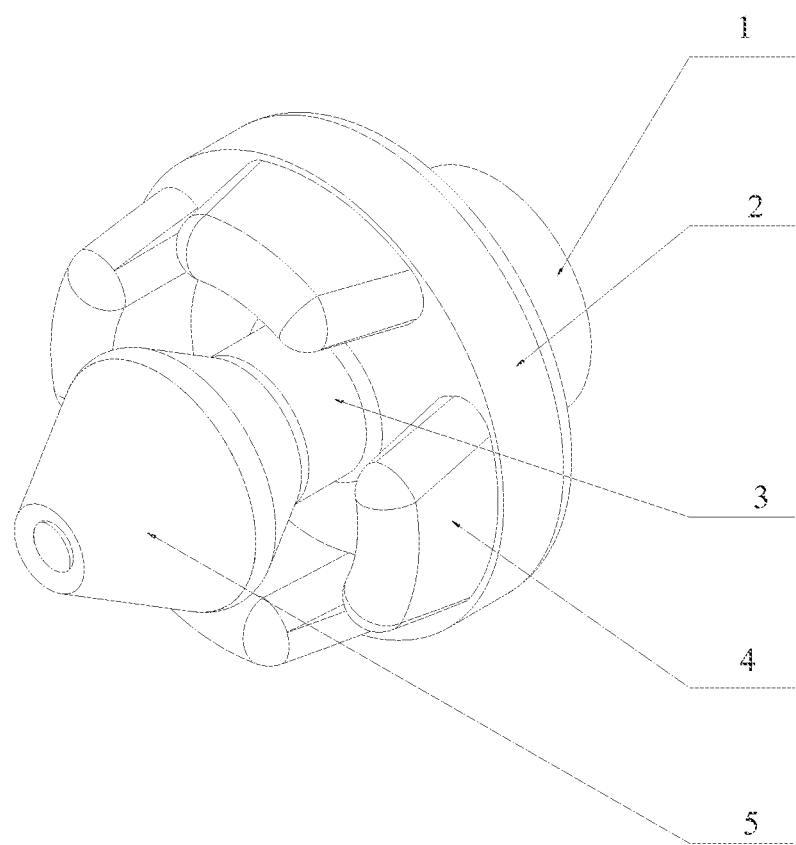
FIG. 2 is a schematic view of a sealing member according to an embodiment of the present disclosure.

Reference will be made in detail to embodiments of the present disclosure. The embodiments described herein with reference to drawings are explanatory, illustrative, and used to generally understand the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

As electric devices, such as electric vehicles and energy storage stations require batteries with higher and higher capacity, the sealing structure of a conventional low-capacity mobile lithium battery may not meet the manufacturing requirement of a high-capacity power battery. Existing high-capacity sealing structures comprise a rubber valve coupled with the cover plate of the battery. The rubber valve is capable of releasing the gas generated inside the battery rapidly and completely, while ensuring the interior of the battery is separated from the outside air, and thus gas expansion can be avoided or minimized. For example, Chinese Patent No. CN201498559U discloses such a battery sealing structure. However, the sealing structure has the following problems. 1) A small diameter through hole is disposed in the bottom of the rubber valve and configured to release gas inside the battery. When the electrolyte is injected into the battery completely, the rubber valve is inserted into the injection hole to seal the battery. When the pressure inside the battery reaches a predetermined pressure, the gas may be discharged outside the battery automatically. However, during the gas discharging process, the switch-on pressure of the rubber valve is not stable, and gas release under low pressure may occur, which further causes a sealing failure. Further, because rubber is flexible, the through hole with the small diameter can be deflected or deformed easily under a pressure, or become blocked by a foreign matter. Thus, the gas inside the battery may not be released successfully. 2) The contact area between an upper protrusion of the cover plate and the cover plate is so small that the connection therebetween may not be tight enough, which is detrimental for the sealing effect of the battery. 3) It is hard to insert the rubber valve into the injection hole, which creates difficulties in the assembling process and inconvenience for the users.

Embodiments of the present disclosure seek to solve at least one of the problems existing in the related art, and provide a sealing member and a battery comprising the sealing member. The sealing member can release the gas from the battery under pressing action, and has a reliable sealing ability and is low in manufacturing cost.

According to embodiments of a first broad aspect of the present disclosure, a sealing member for a battery is provided. The sealing member comprises a sealing part; an operation part having a supporting portion, an operation protrusion is disposed on an upper surface of the supporting portion, and a deformable leg depends from a bottom surface of the supporting portion. The sealing member also comprises a connecting part connecting the sealing part and the operation part, in which the sealing part has a maximum diameter greater than that of the connecting part.

In some embodiments, the sealing member is made of elastic materials. When the sealing member is inserted into an injection hole of the battery and no external force is applied on the sealing member, because the leg is longer than the connecting part, the leg tends to recover and moves upwardly, and thus the first sealing part is lifted up via the connecting part. Thus, the injection hole may be sealed after assembly of the battery, or the injection hole may be sealed rapidly after a gas release process.

When an external force is applied on the protrusion of the second sealing part, the leg is further compressed and the connecting part may move downwardly accordingly together with the first sealing member. When the first sealing part leaves the injection hole and does not contact with the cover plate of the battery, a gap may be formed between the cover plate and the sealing part. Then the gases inside the battery may be released through the gap.

When the external force applied on the protrusion is removed, the leg expands from being compressed and moves upwardly, and the connecting part and the first sealing part are both lifted up, then the injection hole is sealed by the first sealing part again.

In some embodiments, the deformable leg is longer than the connecting part.

In some embodiments, the sealing member is made of elastic materials.

In some embodiments, at least two deformable legs are distributed evenly at a periphery of the bottom surface of the supporting portion and spaced apart from each other. With the at least two deformable legs, the supporting portion may be supported more stably and the external force applied on the supporting portion may be distributed more uniformly thereon. Further, the gases released from the gap may further released to the exterior environment via a space between the deformable legs.

In some embodiments, the deformable leg has an arcuate free end surface.

In some embodiments, the sealing part comprises a truncated-cone-shaped portion connected with the connecting part. The truncated-cone-shaped portion may facilitate to seal the injection hole when the sealing part is lifted up and to leave the injection hole when the gas is released. Thereby, the gas release efficiency of the battery is improved. Further, the truncated-cone-shaped portion also facilitates to prevent water from entering into the battery via the injection hole.

In some embodiments, the sealing part comprises a guiding portion at a bottom thereof, and the guiding portion is connected to the truncated-cone-shaped portion. The guiding portion has an inverted and truncated cone shape. An upper surface of the guiding portion has the same diameter as that of a bottom surface of the truncated-cone-shaped portion, and the guiding portion has a length greater than that of the truncated-cone-shaped portion. With the guiding portion, the sealing member may be guided and inserted into the injection hole more easily.

In some embodiments, the sealing part is hollow. Because the sealing part is hollow, the sealing member may be pressed, extruded, or inserted into the injection hole more easily.

In some embodiments, a hole is formed in the sealing part and extended through the guiding portion in the lengthwise direction of the guiding portion. The hole is extended into the truncated-cone-shaped portion by a predetermined length and has a dome-shaped upper end, and a side wall surface of the hole is transitioned into a bottom surface of the guide portion via an arc dome-shaped upper end. With the hole, the sealing member may be extruded or pressed, which facilitates to process the sealing member and provides the sealing member with a stable structure and a strong supporting capability. Further, the dome-shaped upper end of the hole may prevent the sealing part from being overlifted or damaged during the sealing process. With the transition arc at the bottom of the hole, the assembly for the sealing member is more flexible. Moreover, the transition arc prevents the sealing member from being damaged.

In some embodiments, the supporting portion is configured by a flat plate and a periphery edge of an upper surface of the supporting portion is rounded. When an external force is applied on the operation protrusion, the stress generated on an edge of the supporting portion may be reduced, thus avoiding problems, such as cracks.

In some embodiments, the operation protrusion is disposed at a center of the upper surface of the supporting portion and has a diameter less than that of the supporting portion, and the connecting part is concentric with the supporting portion and the sealing part. Specifically, the centers of the operation protrusion, the supporting portion, the connecting part and the sealing part are located in the same straight line.

In some embodiments, the deformable leg is configured as an arcuate block.

In some embodiments, the deformable leg is configured as a column having a circular cross section.

According to embodiments of a second broad aspect of the present disclosure, a battery is provided. The battery comprises a shell, a cover plate having an injection hole and configured to define a cavity with the shell, a core and electrolyte in the cavity, and a sealing member as described above. The deformable leg is supported on the upper surface of the cover plate, the connecting part is disposed in the injection hole, and the sealing part seals the injection hole.

In some embodiments, the connecting part has a diameter less than that of the injection hole, and the sealing part has a maximum diameter greater than that of the injection hole.

In some embodiments, a covering element is disposed on the cover plate and configured to seal the sealing member together with the cover plate.

According to embodiments of the present disclosure, the length of the deformable leg is greater than that of the connecting part, thus the deformable leg is in a compressive state (compressed onto the upper surface of the cover plate) after the sealing member is inserted in the injection hole. As the leg is elastic, it tends to recover. Thus, with the guide of the supporting portion, the connecting part together with the sealing part may be lifted up. As described above, the diameter of the sealing part is larger than that of the connecting part, so the injection hole may be blocked by the sealing part. In this way, the battery is sealed successfully.

When the sealing part is pressed, such as an external force is applied on the protraction, the deformable legs are further compressed and the first sealing part moves downwardly with the connecting part and leaves the cover plate. Then a gap may be formed between the cover plate and the first sealing part, and the gas inside the battery may be released via the gap successfully.

In addition, when the external force is removed, as the leg has a greater length than that of the connecting part, the leg tends to recover and the sealing part may be lifted up rapidly after the gas release process. In this way, the sealing part may block the injection hole again, thus the injection hole of the battery is sealed.

As described above, with the up and down movements of the connecting part in the injection hole, the sealing member fits with the battery accordingly, which prevents the external environment from influencing the interior of the battery. In some embodiments, the sealing part has a guiding portion. With the guiding portion, it is easier to insert the sealing member into the injection hole. In addition, the guide portion facilitates the fit between the sealing member and the injection hole, which reduces the manufacture cost of the battery, and realizes a stable and reliable sealing and gas release for the battery.

The sealing member according to embodiments of the present disclosure will be described with reference to the drawing below.

The sealing member may be used to seal the injection hole in the cover plate of a battery such as a lithium ion battery. Those skilled in the art that will appreciate that the battery includes a shell having at least one open end, a core disposed in the shell, electrolyte contained in the shell, and a cover plate configured to close the open end of the shell. The shell is generally made of aluminum or steel, and configured to contain the core and electrolyte. The shell may have one open end, and the current is led out from the open end. The shell may have two open ends, and the current is led out from the two open ends of the battery.

The opening in the open end of the shell may be formed in a shorter side of the shell, and the core is inserted into the shell vertically, and a portion of the core extended out of the opening is used as a terminal of the core, so that the current is extracted from the portion of the core.

Alternatively, the opening may be formed in a longer side of the battery, and the core is inserted into the shell horizontally. The portion of the core extended out of the opening is a wound arc edge of the core. The core is formed by stacking or winding a positive plate, a separator and a negative plate in turn. The structure and the manufacture of the core may be known in related art, thus detailed description thereof will be omitted herein.

Generally, an injection hole is formed in at least one cover plate of the battery. After the cover plate is welded with the shell, the electrolyte is fed into the shell via the injection hole. When the filling of the electrolyte is completed, a one-way sealing valve (member) is inserted into the injection hole. In this way, the injection hole, thereby the battery, is sealed, thus isolating the interior of the battery from the external environment, and preventing impurities and water entering into the battery from the external environment. Then the battery is subjected to a transformation process, in which the battery is charged for the first time. During the charging process, a lot of gas is generated and will be released out of the battery via the sealing member by applying a pressure. Generally, the gas may be generated only in the transformation process, and less gas is generated when the battery is charged in the subsequent process. Therefore after the transformation process, a covering element may be welded onto the cover plate and configured to seal the sealing valve (member) and thereby to further seal the injection hole. The covering element generally has a cylindrical projection on the center thereof and is made of metal.

Various improvements on the battery, particularly on the sealing member of the battery, are described in the present disclosure. The sealing member of the present disclosure will be described in detail below with reference to FIGS. 1-6.

Figure 3:
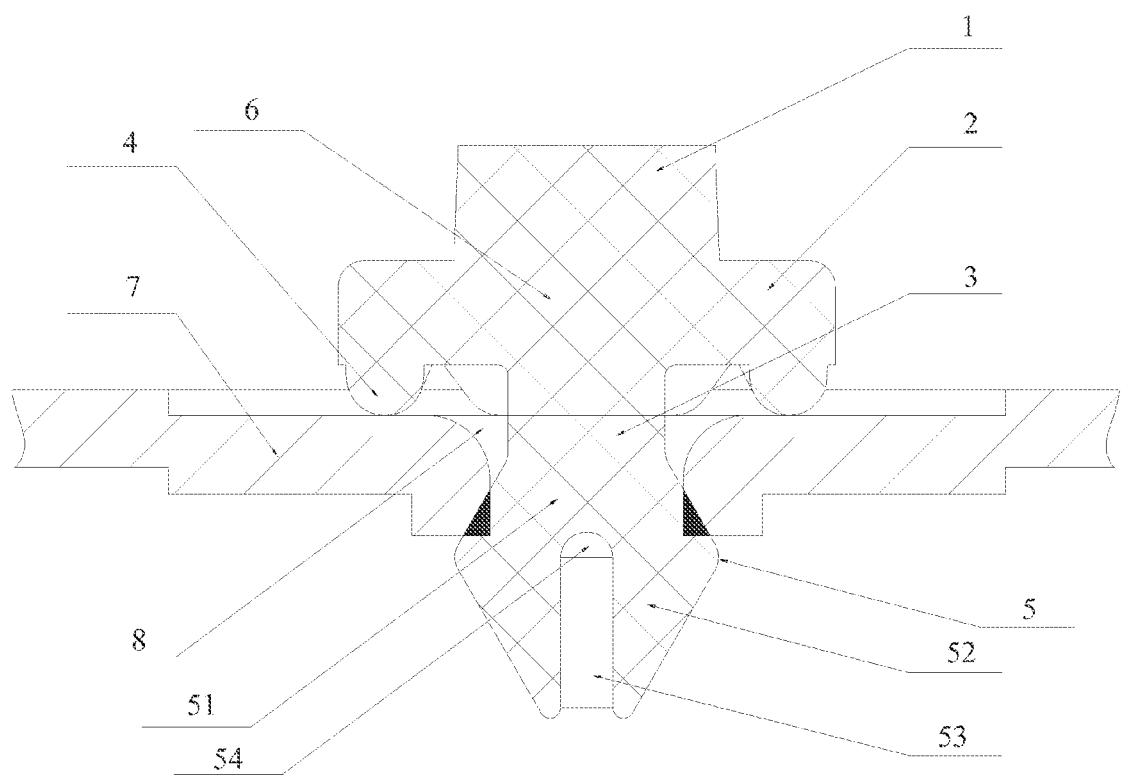
FIG. 3 is a cross-sectional view of a cover plate sealed with a sealing member according to an embodiment of the present disclosure.

It will be understood that the battery according to the present disclosure may refer to any suitable batteries, such as a lithium ion battery. As shown in FIGS. 1-6, a sealing member (may be referred to as "sealing valve") 6 suitable for a battery according to embodiments includes a sealing part 5, an operation part and a connecting part 3 connecting the sealing part 5 and operation part. The operation part has a supporting portion 2. An operation protrusion 1 is disposed on an upper surface of the supporting portion 2, and a deformable leg 4 depends from a bottom surface of the supporting portion 2. The sealing part 5 has a maximum diameter greater than that of the connecting part 3. In one embodiment, the sealing part 5 is longer than the connecting part 3, in other words, the size of the sealing part 5 in the up and down direction in FIG. 3 is larger than that of the connecting part 3.

According to embodiments of the present disclosure, the sealing member 6 may be used to seal an injection hole 8 of a battery such as a lithium ion battery during the transformation process of the battery. Particularly the battery may be high in capacity, for example, a lithium ion power battery, or a lithium ion energy storage battery.

In some embodiments, the sealing member 6 is made of elastic materials, for example, non-metallic materials having good resilience. By way of example and without limitations, the sealing member 6 may be made of polytetrafluoroethylene (TPFE), ethylene propylene diene monomer (EPMD), and fluoride rubbers. In one embodiment, the sealing member 6 is integrally made of a rubber by using a molding process, such as an injection molding process.

In some embodiments, when the sealing member 6 is inserted into the injection hole 8, the deformable leg 4 is supported onto the upper surface of the cover plate 7, in other words, the deformable leg 4 is pressed onto the upper surface of the cover plate 7 under a pull from the connecting part 3 and the sealing part 5.

In some embodiments, the operation protrusion 1 is disposed on the upper surface of the supporting portion 2. An external force may be applied on the protrusion 1, then a pressure brought by the external force on the supporting portion 2 may be buffered, which provides the supporting portion 2 with a better mechanical performance. By providing the operation protrusion 1 on the supporting portion 2, the supporting portion 2 is avoided from blocking the injection hole 8 when the external force is applied. Thus, gas may be released successfully from the inside of the battery.

Figure 5:
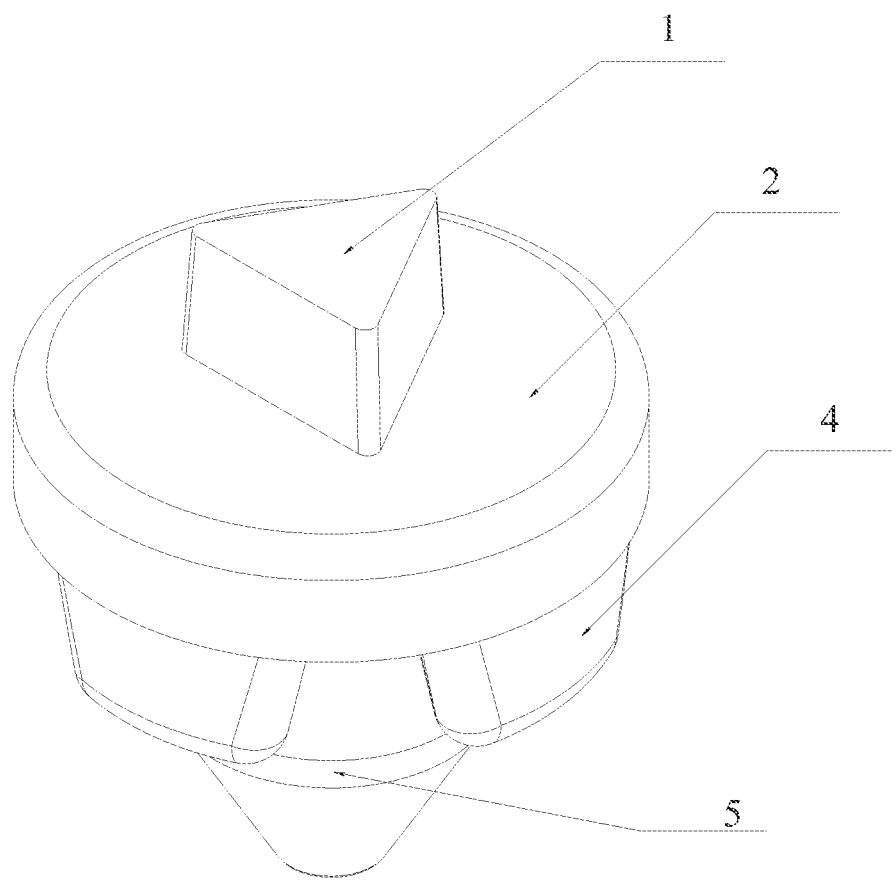
FIG. 5 is a schematic view of a sealing member according to another embodiment of the present disclosure.

In one embodiment, as shown in FIG. 1, the operation protrusion 1 may be a projected portion extended out from the upper surface of the supporting portion 2. There are no particularly limitations to the shape of the operation protrusion 1. For example, the operation protrusion 1 may have a cross section of trigon (as shown in FIG. 5), square, and oval. In the embodiment shown in FIG. 1, the operation protrusion 1 is a cylinder, in which a diameter of a bottom surface of the cylinder is smaller than that of the supporting portion 2. For example, the diameter of the bottom surface of the cylinder is about 50% to about 60% times of that of the supporting portion 2, and the height of the cylinder is about 1 to about 1.5 times of that of the supporting portion 2.

In some embodiments, the operation protrusion 1 is disposed on a center of the upper surface of the supporting portion 2. In this way, the external force may be distributed on the supporting portion 2 uniformly. Specially, the centers of the operation protrusion 1, the supporting portion 2, the connecting part 3, and the sealing part 5 are in the same straight line.

In some embodiments, as shown in FIG. 3, the supporting portion 2 pulls the connecting part 3 upwardly under the elastic action of the deformable leg 4. In some embodiments, the diameter of the supporting portion 2 is greater than that of the injection hole 8. The cross section of the supporting portion 2 may be square or oval. The thickness of the supporting portion 2 is not limited in the present disclosure, for example, the support portion 2 is 1.5 mm to 3 mm in thickness. In one embodiment, the supporting portion 2 is a flat plate. In another embodiment, the supporting plate may be a circular plate having a thickness of 2 mm.

In some embodiments, the supporting portion 2 has an arcuate free upper surface. When the external force is applied on the operation protrusion 1, for example, the operation protrusion 1 is pressed by an operator, for example, the operation protrusion 1 is pressed by an operator, a strain generated on the edge of the supporting portion 2 may be reduced, thus avoiding cracking problems.

In some embodiments, when the sealing member 6 is inserted into the injection hole 8, the sealing part 5 is located below the upper surface of the cover plate 7, and the operation part is located above the upper surface of the cover plate 7.

The shape of the connecting part 3 may be designed according to the shape of the injection hole 8. Generally, the connecting part 3 is a cylinder having a diameter slightly smaller than that of the injection hole 8. The connecting part 3 is movable (for example, movable upwardly or downwardly in FIG. 3) in the injection hole 8, while gas may be released via a gap between the connecting part 3 and the cover plate 7. In one embodiment, the connecting part 3 is disposed on the center of the bottom surface of the supporting portion 2 and the center of the upper surface of the sealing part 5. The operation part may include one or more deformable legs 4, and the deformable legs 4 are distributed evenly at a periphery of the bottom surface of the supporting portion 2.

In some embodiments, the deformable leg 4 is located on the bottom surface of the supporting portion 2 and has a length greater than that of the connecting part 3. In addition, the leg 4 is elastic. The supporting portion 2 normally pulls the connecting part 3 to move upwardly under the recovering elastic force of the deformable leg 4, thus pulling the sealing part 5 upwardly and sealing the injection hole 8 accordingly. When the operation protrusion 1 is pressed by an external force, the elastic deformable leg 4 moves downwardly under the external force, and the sealing part 5 moves downwardly and is separated from the wall of the injection hole 8. In this way, a gap may be formed between the first sealing part 5 and the cover plate, and the gas inside the battery may be released via the gap.

In some embodiments, the operation part includes one deformable leg 4 configured as a sleeve and disposed at the bottom surface of the supporting portion 2. In this embodiment, the deformable leg 4 is capable of releasing gas therein. For example, a ventilation hole or a slot may be formed in the deformable leg 4 so that gas inside the leg may be released through the ventilation hole or the slot.

Figure 6:
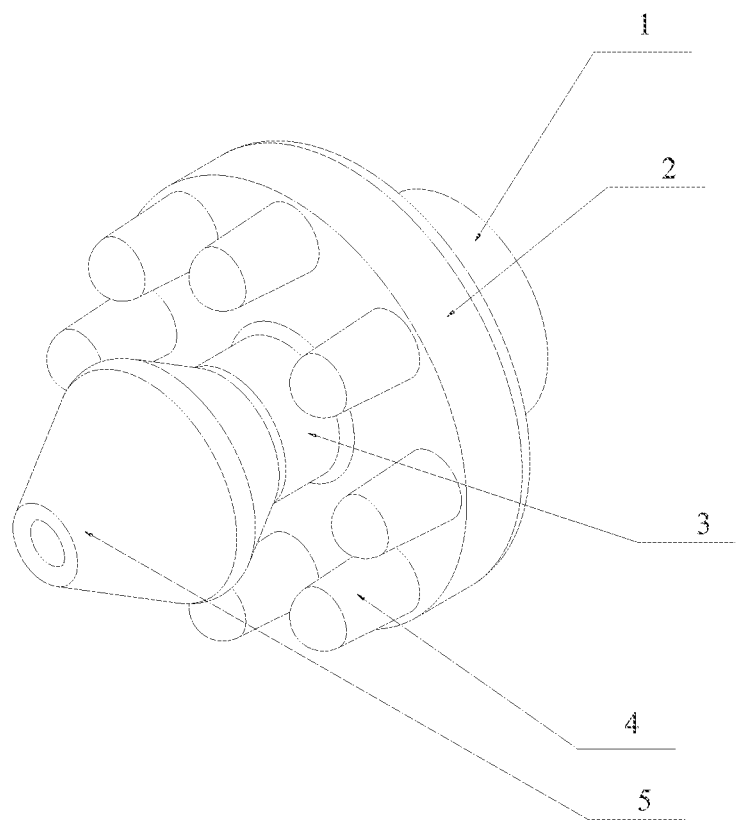
FIG. 6 is a schematic view of a sealing member according to another embodiment of the present disclosure.

In some embodiments, the operation part includes a plurality of deformable legs 4 disposed evenly at a peripheral of the bottom surface of the supporting portion 2 and distributed symmetrically relative to the connecting part 3. The deformable legs 4 are spaced apart from the connecting part 3, so that the gas can be released from the intervals between adjacent deformable leg 4. In this way, the supporting portion 2 is supported by the deformable legs 4 stably and uniformly on the cover plate of the battery According to an embodiment of the present disclosure, the shape of the deformable leg 4 is not limited, which may be a cylinder (as shown in FIG. 6), a cone, a diamond and a truncated cone. In one embodiment, a cross-section of the deformable leg is a segment of circular ring, and the cross-section area of the deformable leg 4 is decreased gradually from up to down in FIGS. 1 and 2. In some embodiments, the deformable leg 4 has an arcuate free end surface. With the arcuate free end surface to be contacted with the upper surface of the cover plate 7, so that damages to the cover plate 7 and the deformable legs 4 may be avoided. Further, the arcuate free end surface facilitates the supporting portion 2 to withstand the external force.

In one embodiment, the deformable leg 4 is configured as an arcuate block. Alternatively, the deformable leg 4 is configured as a column having a circular cross section.

In some embodiments, when the sealing member 6 is mounted to the cover plate 7, the sealing part 5 is in the shell of the battery, and the maximum diameter of the sealing part 5 is greater than that of the injection hole 8, so that the injection hole 8 is sealed by the sealing part 5. There is no limit to the shape of the sealing part 5, as long as the sealing part 5 can seal the injection hole 8. In some embodiments, the sealing part 5 is hollow. During inserting the sealing part 5 through the injection hole 8, the sealing part 5 may retract, thus facilitating the insertion of the sealing part 5 through the injection hole 8.

In some embodiments, the sealing part 5, i.e., the sealing element has a hollow structure. The hollow structure may locate along the central line of the sealing part 5, and the size of the hollow structure may be designed according to practical requirement. For example, it is required the sealing member 6 may be extruded or pressed. During the assembly process, the first sealing part 5 may retracted to a smaller size, which facilitates the sealing member 6 to be inserted into the injection hole 8.

In some embodiments, the sealing part 5 includes a truncated-cone-shaped portion 51 connected with the connecting part 3. The diameter of the upper surface of the truncated-cone-shaped portion 51 may be the same as that of the connecting part 3. With the truncated-cone-shaped portion 51, it is more convenient to seal and open the injection hole 8, thus improving the gas release efficiency of the battery. In addition, it prevents water from entering into the interior of the battery.

In some embodiments, the sealing part 5 includes a guiding portion 52 at the bottom thereof. The guiding portion 5 may have any shape having a guiding function, such as a cone. By providing the guiding portion 52, it is more convenient to insert the sealing part 5 through the injection hole 8.

The guiding portion 5 may have any shape having a guiding function, such as a cone. By providing the guiding portion 52, it is more convenient to insert the sealing part 5 through the injection hole 8.

As shown in FIG. 3, the guiding portion 52 is connected with the truncated-cone-shaped portion 51. The guiding portion 52 has an inverted and truncated cone shape. An upper surface of the guiding portion 52 has the same diameter as that of a bottom surface of the truncated-cone-shaped portion 51, and the guiding portion 52 has a length greater than that of the truncated-cone-shaped portion 51. In one embodiment, a hole 53 is formed in the guiding portion 52 and extended through the guiding portion 52 in an up-down direction in FIG. 3, so that the sealing part 5 is configured to have a hollow structure. The hole is extended into the truncated-cone-shaped portion 51 so as to form dome-shaped upper end 54, and a side wall surface of the hole 53 is transitioned into a bottom surface of the guide portion 52 via arc, thus facilitating the movement of the sealing part 5. The length of the guiding portion 52 may be greater than that of the truncated-cone-shaped portion 51, thus facilitating the assembly of the sealing member 6. With the dome-shaped upper end 54, the sealing member 6 has a stable structure and a strong supporting capability. Further, the dome-shaped upper end 54 may prevent the sealing part 5 from being overly moved upwards or damaged during sealing process. The side wall surface of the through hole 53 is transitioned into the bottom surface of the guide portion 52 via arc, thus the assembly of the sealing member 6 is more flexibly. Moreover, the transition arc prevents the sealing member 6 from being damaged.

A battery including the sealing member 6 described above may be explained below in detail.

Figure 4:
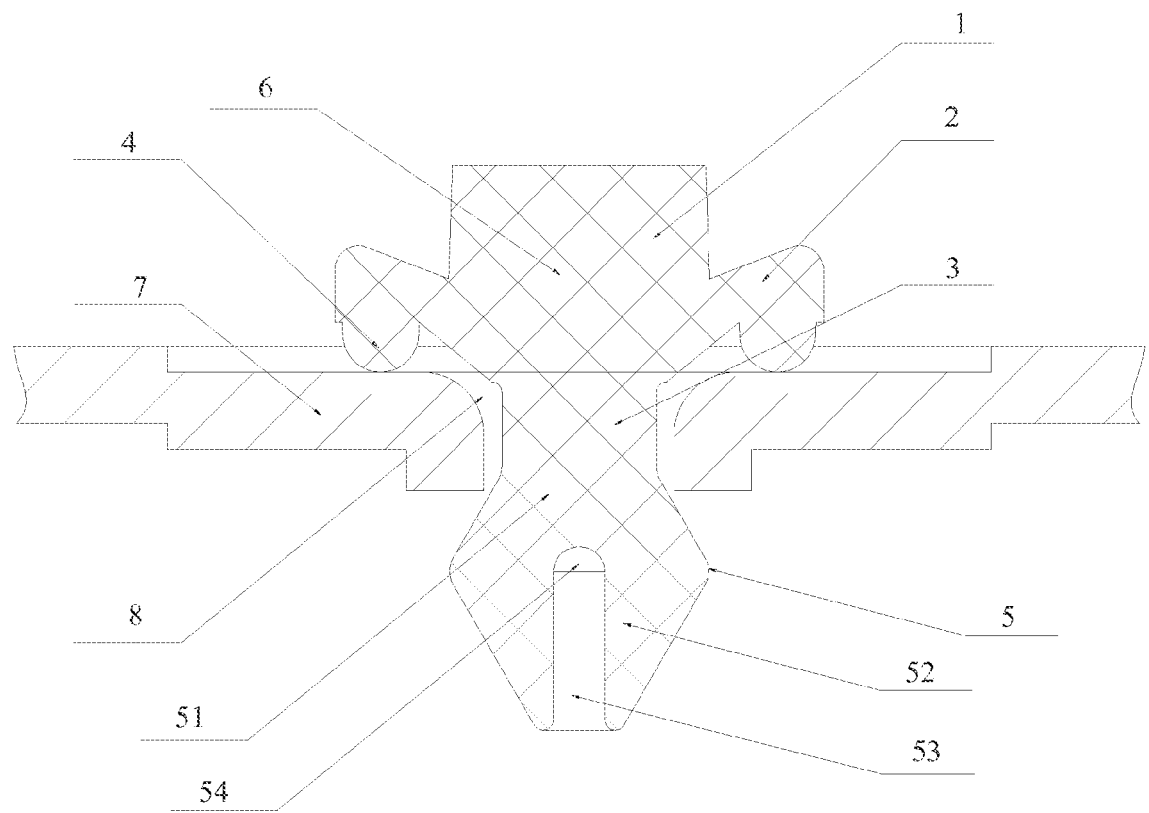
FIG. 4 is a cross-sectional view of the sealing member as shown in FIG. 3 and in a gas release state.

As shown in FIGS. 3 and 4, the battery includes a shell (not shown), a cover plate 7 having an injection hole 8 and configured to define a cavity with the shell, a core (not shown) and electrolyte (not shown) contained in the cavity, and a sealing member which may the sealing member 6 described above. The deformable leg 4 is supported onto the upper surface of the cover plate 7, the connecting part 3 is in the injection hole 8, and the sealing part 5 is seals the injection hole 8 and adapted to open the injection hole 8 under pressing the operation part.

In some embodiments, the connecting part 3 has a diameter smaller than that of the injection hole 8, and the sealing part 5 has a maximum diameter greater than that of the injection hole 8.

In some embodiments, a covering element (not shown) is disposed on the cover plate 7 and configured to seal the sealing member 6 together with the cover plate 7.

The sealing and gas release process of the battery according to embodiments of the present disclosure will be described below with reference to FIGS. 3 and 4.

As shown in FIG. 3, the battery is in a sealed state. When the sealing member 6 is mounted to the cover plate and no external force is applied on the sealing member 6, the deformable legs 4 are deformed, i.e., the deformable legs 4 are compressed onto the upper surface of the cover plate. As the diameter of the connecting part 3 is smaller than that of the injection hole 8, the connecting part 3 and the sealing part 5 are pulled upwards by the supporting portion 2 under the elastic force of the legs 4. Because the maximum diameter of the sealing part 5 is larger than that of the injection hole 8, the sealing part 5 seals the injection hole 8 when the sealing part 5 comes into contact with covering plate 7.

As shown in FIG. 4, the battery is in a gas release state. When an external force is applied on the sealing member 6, for example, the operation protrusion 1 is pressed by the external force, the deformable leg 4 is further compressed. The connecting part 3 and the sealing part 5 move downwardly. When the sealing member 5 is separated from the cover plate, a gap is formed between the sealing part 5 and the cover plate 7 thus opening the injection hole 8, so that the gas inside the battery may be released via the gap.

When the external force applied on the operation protrusion 1 is removed, the sealing part 5 moves upwardly under the recovering elastic force of the deformable leg 4. When the sealing part 5 comes into contact with the cover plate 7, the injection hole 8 is sealed by the sealing part 5 again.

In embodiments of the present disclosure, the deformable leg 4 is in a deformed state (compressed onto the upper surface of the cover plate) after the sealing member 6 is mounted to the cover plate 7. As the deformable leg 4 is deformable and tends to recover. The connecting part together with the sealing part is driven to move upward under the recovering elastic force of deformable legs. As described above, the diameter of the sealing part is larger than that of the connecting part, so the injection hole may be sealed by the sealing part.

When the sealing member is pressed, such as an external force is applied on the operation protrusion, the deformable legs are further compressed and the sealing part opens the injection hole. Then a gap may be formed between the cover plate and the sealing part, and the gas inside the battery may be released via the gap.

In addition, when the external force is removed, the deformable legs tend to recover from the deformed state and stretches upwardly, thus pulling the connecting part upwards. Then the sealing part may be moved upwards with the connecting part under the pulling of the deformable legs. In this way, the sealing part may seal the injection hole again, thus the battery is sealed.

As described above, with the upward and downward movements of the sealing member, the sealing member seals and opens the injection hole accordingly. With the guiding portion, it is easier to insert the sealing part through the injection hole.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

The invention claimed is:

1. A battery, comprising:
   a shell;
   a cover plate having an injection hole and configured to define a cavity with the shell;
   a core and electrolyte in the cavity; and
   a sealing member, the sealing member comprising:
      a sealing part;
      an operation part having a supporting portion;
      an operation protrusion disposed on an upper surface of the supporting portion;

at least two deformable legs integrally formed with the supporting portion and extended out from a bottom surface of the supporting portion; and a connecting part connecting the sealing part and the operation part, wherein the at least two deformable legs are supported on the upper surface of the cover plate; the connecting part is disposed in the injection hole; and the sealing part seals the injection hole and is adapted to open the injection hole upon pressing the operation part; and wherein the at least two deformable legs are longer than the connecting part; and wherein the at least two deformable legs are distributed evenly at a periphery of the bottom surface of the supporting portion and spaced apart from each other.

2. A battery, comprising:

a shell;

a cover plate having an injection hole and configured to define a cavity with the shell;

a core and electrolyte in the cavity; and a sealing member, the sealing member comprising:

a sealing part;

an operation part having a supporting portion;

an operation protrusion disposed on an upper surface of the supporting portion;

at least two deformable legs integrally formed with the supporting portion and extended out from a bottom surface of the supporting portion; and a connecting part connecting the sealing part and the operation part, wherein the sealing part has a maximum diameter greater than that of the connecting part; and wherein the at least two deformable legs are longer than the connecting part; and wherein the at least two deformable legs are distributed evenly at a periphery of the bottom surface of the supporting portion and spaced apart from each other.

3. The battery according to claim 1, wherein the sealing part comprises a truncated-cone-shaped portion connected with the connecting part.

4. The battery according to claim 3, wherein the sealing part comprises a guiding portion at a bottom thereof, and the guiding portion is connected to the truncated-cone shaped portion, wherein the guiding portion has an inverted and truncated cone shape, wherein an upper surface of the guiding portion has the same diameter as that of a bottom surface of the truncated-cone-shaped portion, and wherein the guiding portion has a length greater than that of the truncated-cone-shaped portion.

5. The battery according to claim 4, wherein the sealing part is hollow.

6. The battery according to claim 5, wherein a hole is formed in the sealing part and extended through the guiding portion in a length direction of the guiding portion, wherein the hole is extended into the truncated-cone shaped portion by a predetermined length and has a dome-shaped upper end, wherein a side wall surface of the hole is transitioned into a bottom surface of the guide portion via arc.

7. The battery according to claim 1, wherein the supporting portion is configured by a flat plate and a periphery edge of an upper surface of the supporting portion is rounded.

8. The battery according to claim 1, wherein the operation protrusion is disposed at a center of the upper surface of the supporting portion and has a diameter smaller than that of the supporting portion, and the connecting part is concentric with the supporting portion and the sealing part.

9. The battery according to claim 1, wherein the at least two deformable legs are configured as a column having a circular cross section.

10. The battery according to claim 2, wherein the connecting part has a diameter less than that of the injection hole.

11. The battery according to claim 2, wherein the sealing part has a maximum diameter greater than that of the injection hole.

12. The battery according to claim 2, wherein the at least two deformable legs are compressed onto the upper surface of the cover plate such that the injection hole is sealed by the sealing member.

* * * * *